United States Patent Office.

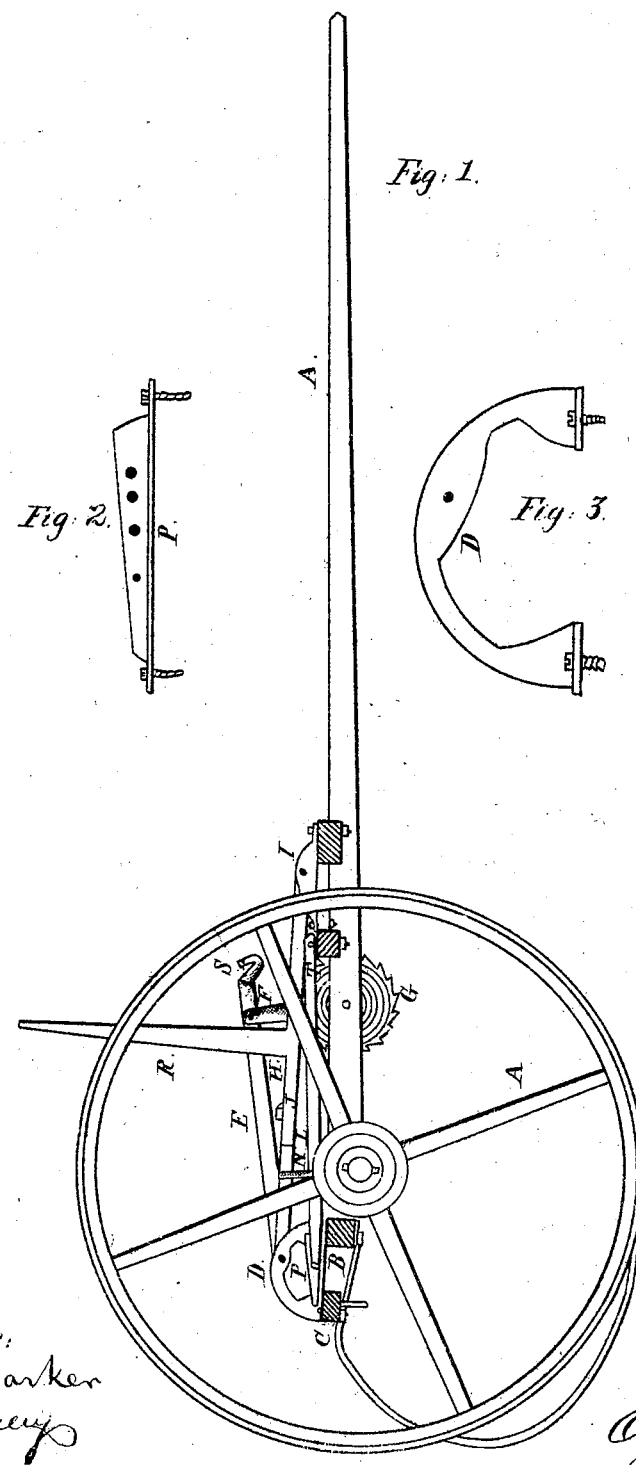

OZIEL NIVISON, OF HECTOR, NEW YORK.

Letters Patent No. 73,457, dated January 21, 1868.

IMPROVEMENT IN HORSE-RAKES.

*The Schedule referred to in these Letters Patent and making part of the same.*

TO ALL WHOM IT MAY CONCERN:

Be it known that I, OZIEL NIVISON, of the town of Hector, Schuyler county, New York, have invented an Improved Horse-Rake; and I do hereby declare that the following is a full and exact description thereof, reference being had to the annexed drawings, and to the letters thereon.

Figure 1 is a view of my horse-rake, and

Figures 2 and 3 are parts thereof.

My object is to so improve a rake, dumping or unloading by the action of a spring, that the work of the rake shall be better done than with a spring alone; and also to use my improvement so that I can unload a rake easily when no spring is used. This I accomplish by various devices, which are—

First. Lengthening of the rod between the parts controlling the teeth and the spring-lever, and making on the forward end of the said rod a stirrup for the foot of the operator, thus making my rake dump or unload mainly by the spring, but aided and controlled by the stirrup.

Second. I join the pressure-bar and the rake-head by a rigid circular piece, which has the effect of making the staple and pressure-bar a part of the rake-head, by their inflexibility; and at the same time the extreme convexity of the said circular piece gives such a point of attachment that it subserves and accomplishes another purpose, viz, of a more powerful point of motion, thus making the unloading of the rake an easier process.

Third. Still further to aid in the unloading of the rake, I construct two or more hinge-pieces, also connecting the rake-head and the staple-bar, when united as described, and near the middle of these I hinge or pivot the rake, so that it there turns in unloading, thus making the weight of the head aid in the unloading. Several holes are made in this piece, so that it is adjustable to the varied articles raked, and thus give greater capacity to the rake. The hinges are on rods or parts, also hinged at their other ends, and playing in staples on the axles, for the purpose of allowing the rake and its load to vary with the surface of the ground, while the carriage goes on, its wheels also varying with the surface they pass over.

In the drawings, A and A, fig. 1, are the thills, frame, and wheels of the rake-carriage, and B is the rake-head, and C is the staple and pressure-bar, rigidly connected by the pieces D, and E is the rod connecting the circular pieces D and the spring-arm F; and the spring coiled about a shaft, held in place by the ratchet, G, acts through E and D on the united staple-bar and head. The end of E is extended beyond the pivot at F, and has on its extremity the foot-stirrup, S. The hand-lever R is part of the jointed levers and rods connecting D J, and I. The variable rods or parts L, are hinged in front, at T, to a cross-bar of the carriage-frame, go through the staples N, out of the axle, and are also hinged, at P, to the plate P, connecting the staple-bar and head.

In fig. 2, the plate P is seen enlarged and by itself, and shows the holes for adjusting the rake to the variable rods, L; and in fig. 3 the circular pieces D are seen by themselves.

The uses of my invention are apparent to those skilled in the art to which it appertains.

*Claims.*

1. The foot-stirrup S, arranged in connection with the spring G, so that the operator can thereby aid the spring in unloading the rake, as described.

2. The hinge-plates P, connecting the staple-bar C and rake-head B, and provided with a series of holes, in combination with the hinged rods L, so that the weight of the head thereon aids in unloading the rake, as set forth.

3. The combination of the spring G, rod E, provided with the foot-stirrup S, circular piece D, hinge-plates P, pressure-bar C, and head B, arranged and operating substantially as and for the purposes set forth.

OZIEL NIVISON.

Witnesses:
SAMUEL J. PARKER,
T. J. McELHENY.